US007004187B2

(12) United States Patent
Hoffman

(10) Patent No.: US 7,004,187 B2
(45) Date of Patent: Feb. 28, 2006

(54) LINE PRESSURE DIVERTER APPARATUS

(76) Inventor: Andrew Hoffman, 1831 62nd Ave., Fennville, MI (US) 49408

( * ) Notice: Subject to any disclaimer, the term of this patent is extended or adjusted under 35 U.S.C. 154(b) by 221 days.

(21) Appl. No.: 10/701,357

(22) Filed: Nov. 4, 2003

(65) Prior Publication Data

US 2005/0092361 A1 May 5, 2005

(51) Int. Cl.
*F16K 17/14* (2006.01)

(52) U.S. Cl. ............................... 137/68.19; 137/68.23; 137/218; 137/14; 137/878

(58) Field of Classification Search ............. 137/68.19, 137/68.23, 217, 218, 68.24, 878, 879, 881, 137/14

See application file for complete search history.

(56) References Cited

U.S. PATENT DOCUMENTS 4,125,126 A * 11/1978 Davis, Jr. ................ 137/493.1
5,407,830 A * 4/1995 Altman et al. ................ 436/55

* cited by examiner

*Primary Examiner*—Stephen Blau
*Assistant Examiner*—Craig Schneider
(74) *Attorney, Agent, or Firm*—King & Partners, PLC

(57) ABSTRACT

A line pressure diverter for placement between a rupture line and a rupture disc associated with a reactor. The line pressure diverter comprising a first passage, a second passage, a vacuum breaker and a check valve. The first passage being positioned to be in fluid communication with the rupture line at a first end and with a rupture disc at a second end. The second passage being positioned to be in fluid communication with the first passage and positioned at an angle relative to the first passage. The vacuum breaker being positioned so as to extend through and into the second passage. The check valve being positioned to be in fluid communication with the second passage, the check valve being rated at a rating below that of a rupture disc.

11 Claims, 2 Drawing Sheets

LINE PRESSURE DIVERTER APPARATUS

BACKGROUND OF THE INVENTION

1. Field of the Invention

The present invention relates in general to a reactor safety system component, and more particularly to a line pressure diverter apparatus for use in association with a chemical reactor, a reaction vessel or a containing vessel to preclude catastrophic failure of same.

2. Background Art

The manufacture of various types of chemical compositions requires the mixing of constituents in large reactors. Such reactors are required to include means for controlling an unexpected increase in pressure without violent explosion or other catastrophic failure.

One manner in which catastrophic explosions are avoided are by way of rupture lines associated with the reactors. One such arrangement is shown in FIG. 1 as comprising rupture lines, such as rupture line 100 and rupture line header 110. Each rupture line 100 is associated with a reactor, such as reactor 112 separated from fluid communication by a rupture disc, such as rupture disc 114. The several rupture lines are associated with a rupture line header which then is exhausted to a chamber or reservoir.

In operation, if the pressure in the reactor exceeds a predetermined pressure, the rupture disc ruptures placing the reactor cavity in fluid communication with the rupture line header, and the pressure is released through the rupture line and the rupture line header.

While this solution has improved the safe operation of reactors, the system has certain drawbacks. For example, in certain instances, the reaction in one reactor may increase beyond a predetermined limit causing the rupturing of the rupture disc 114 associated with the reactor. The rupture of the rupture disc places the internal cavity of the reactor in fluid communication with the associated rupture line, and, in turn, with the rupture line header. If the pressure released into the rupture header is elevated, it is possible to rupture other rupture discs which are in fluid communication with the rupture line header. In such an event, the reactors associated with the other rupture discs may become contaminated, resulting in further undesired—and perhaps uncontrollable—reactions.

Accordingly, it is an object of the invention to preclude rupturing of the rupture disc in the event that excess pressure is observed within the rupture line.

It is another object of the invention to provide for a diverter which facilitates the ingress of air in the event that a vacuum condition is present in the rupture line.

It is another object of the invention to overcome the deficiencies in the prior art.

These and other objects of the invention will become apparent in light of the specification and claims appended hereto.

SUMMARY OF THE INVENTION

The invention comprises a line pressure diverter apparatus for placement between a rupture line and a rupture disc associated with a reactor. The line pressure diverter apparatus includes a first passage, at least one second passage, a vacuum breaker and a check valve. The first passage is positioned to be in fluid communication with the rupture line at a first end and with a rupture disc at a second end. The at least one second passage is positioned to be in fluid communication with the first passage and positioned at an angle relative to the first passage. The vacuum breaker is positioned so as to extend through and into at least one of the at least one the second passages. The check valve is positioned to be in fluid communication with at least one of the at least one second passages, the check valve being rated at a rating below that of a rupture disc.

In a preferred embodiment, the first passage comprises a diameter substantially identical to that of a rupture line with which it is associated.

In a preferred embodiment, the angle of the first passage relative to the second passage is substantially approximately between 25° and 75°.

In another preferred embodiment, the angle of the first passage relative to the second passage is substantially approximately 45°.

In another preferred embodiment, the line pressure diverter further includes clamps associated with each of the rupture line and the rupture disc, for coupling the line pressure diverter thereto.

In yet another preferred embodiment, each of the first and second passages comprises pipes of substantially circular cross-section.

In a preferred embodiment, the first passage is of a diameter larger than that of the second passage.

Preferably, the first passage is longer than the second passage. Additionally, the first passage and the second passage are positioned relative to each other so as to facilitate a venturi effect.

In one embodiment, a single second passage is utilized and each of the check valve and the vacuum breaker are associated with the single second passage.

The invention further comprises a method of diverting flow in a rupture line comprising the steps of: (a) providing a line pressure diverter for placement between a rupture line and a rupture disc associated with a reactor, the line pressure diverter comprising: (1) a first passage positioned to be in fluid communication with a rupture line at a first end and with a rupture disc at a second end; (2) at least one second passage positioned to be in fluid communication with the first passage and positioned at an angle relative to the first passage; (3) a vacuum breaker positioned so as to extend through and into at least one of the at least one second passages; and (4) a check valve positioned to be in fluid communication with the at least one second passage, the check valve being rated at a rating below that of a rupture disc; (b) opening the vacuum breaker in the event that the rupture disc associated with the rupture line is triggered, and a vacuum exists in the second passage with which the vacuum breaker is associated; (c) opening the check valve in the event that the pressure in the rupture line approaches the pressure rating of the rupture disc within a predetermined limit; and (d) maintaining either of the vacuum breaker and the check valve until the requisite pressure is present in the respective one of the at least one second passages.

BRIEF DESCRIPTION OF THE DRAWINGS

The invention will now be described with reference to the drawings wherein.

DETAILED DESCRIPTION OF THE INVENTION

Figure 1:
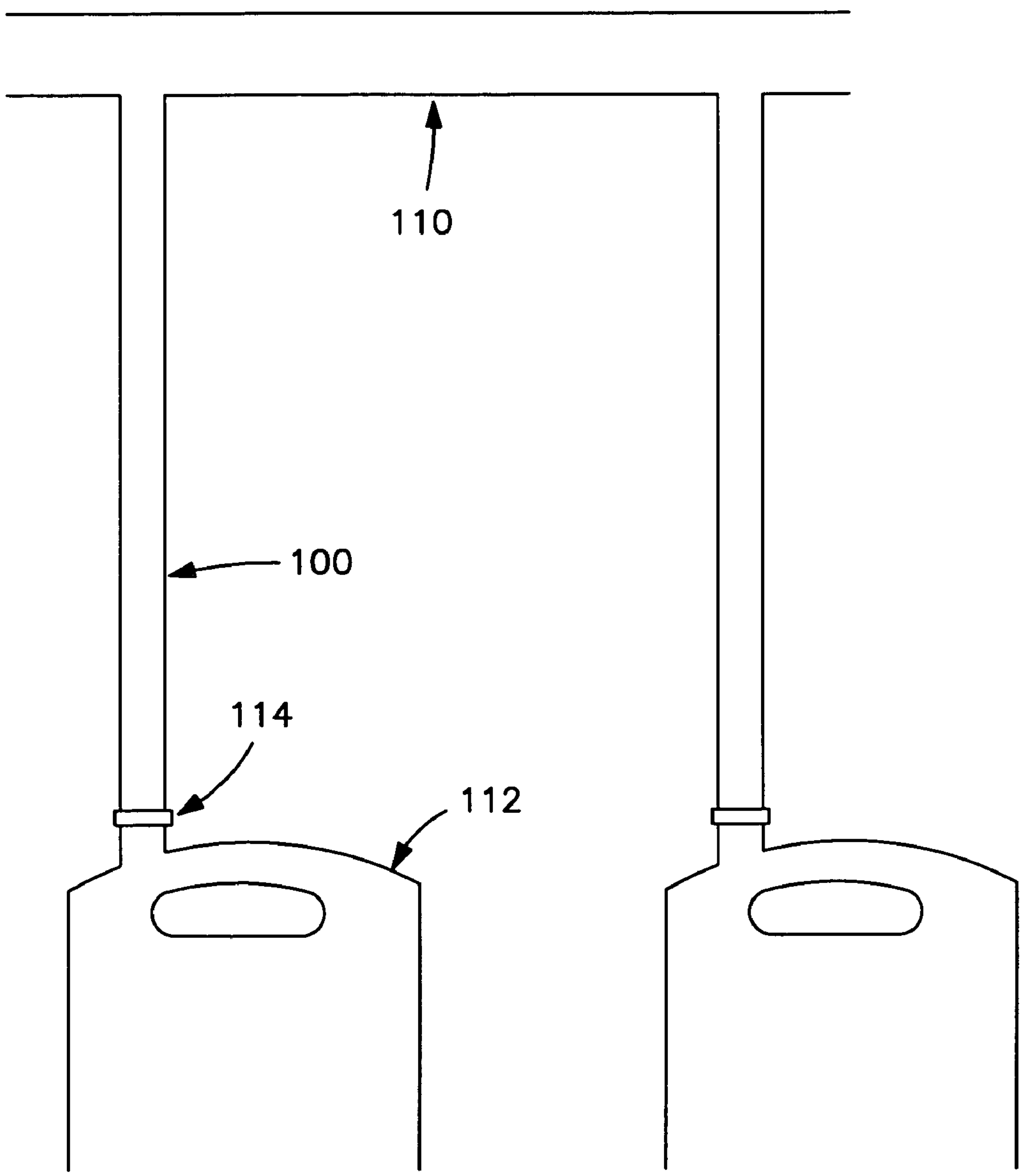
FIG. 1 of the drawings is a schematic representation of a prior art reactor safety system.

While this invention is susceptible of embodiment in many different forms, there is shown in the drawings and described herein in detail several specific embodiments with the understanding that the present disclosure is to be considered as an exemplification of the principles of the invention and is not intended to limit the invention to the embodiments illustrated.

It will be understood that like or analogous elements and/or components, referred to herein, may be identified throughout the drawings by like reference characters. In addition, it will be understood that the drawings are merely schematic representations of the invention, and some of the components may have been distorted from actual scale for purposes of pictorial clarity.

Figure 2:
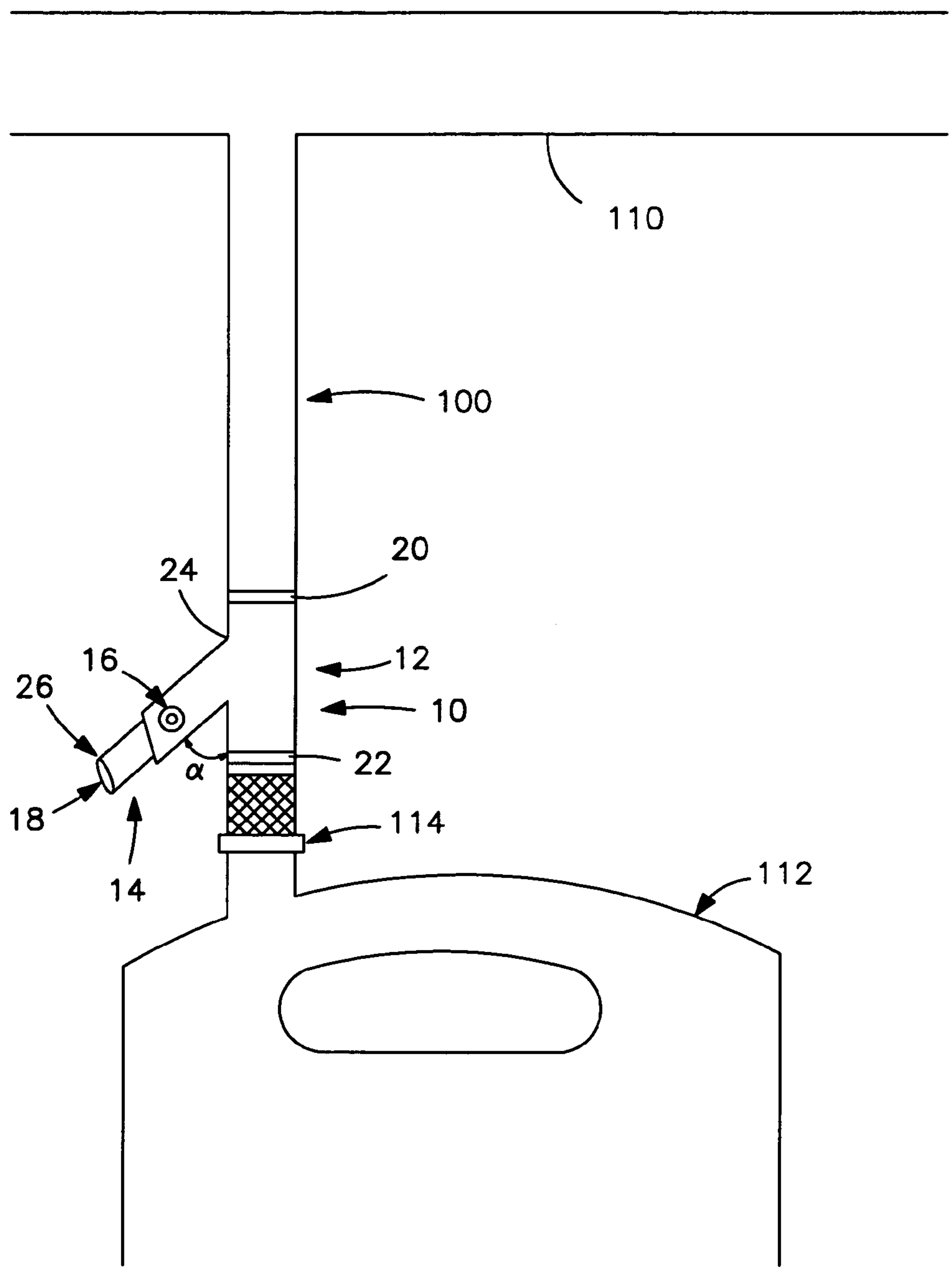
FIG. 2 of the drawings is a schematic representation of a reactor safety system having a line pressure diverter of the present invention.

Referring now to the drawings and in particular to FIG. 2, line pressure diverter 10 comprises first passage 12, second passage 14, vacuum breaker 16 and check valve 18. The pressure line diverter is positioned between rupture disc 114 and rupture line 100. The rupture disc 114 is associated with the reactor and the rupture line 100 is associated with rupture line header 110.

First passage 12 includes first end 20 and second end 22. First end 20 is in fluid communication with rupture line 100 and second end 22 is in fluid communication with rupture disc 114. Generally first passage 12 comprises a steel pipe of a predetermined diameter which is generally matched to the rupture line.

Second passage 14 is shown in FIG. 2 as comprising first end 24 and second end 26. First end 24 is placed in fluid communication with first passage 12 between first end 20 and second end 22 of first passage 12. The second passage is angled relative to the first passage at an angle $\alpha$ which may be varied. The contemplate angle of inclination is substantially approximately between 25° and 75°, and most preferably 45°. Of course, other angles are likewise contemplated. It is likewise contemplated that the angles may be varied depending on the environment.

Preferably, the passages are substantially the same cross-sectional area, and substantially uniform in shape. Of course, various different shapes and dimensions are contemplated. Furthermore, it will be understood that the first passage is generally longer than the second passage, however, different embodiments are likewise contemplated.

Vacuum breaker 16 is shown in FIG. 2 as being positioned so as to extend through second passage 14 between the first and second ends thereof. The vacuum breaker is positioned to facilitate the passage of air into the second passage from ambient in the event that a vacuum is pulled within the second passage. One such vacuum breaker is available from JOCO of Three Rivers, Mich. Of course, various other vacuum breakers are contemplated for use.

Check valve 18 is shown in FIG. 2 as being positioned proximate second end 26 of second passage 14. Check valve 18 is configured so as to open to ambient in the event pressure within second passage 14 is in excess of a predetermined pressure. Check valve 18 is rated to open to ambient at a pressure below that at which the rupture disc is rated to burst. One such check valve is available from Capitol Manufacturing Company of Canada. It is contemplated that the check valve may be positioned in a different "second passage" relative to the vacuum breaker.

It will be understood that multiple passages may be provided to enhance the flow provided by the check valve and/or the vacuum breaker. For example, two separate "second passages" can be provided, wherein each includes a check valve and a vacuum breaker. In other embodiments, multiple "second passages" can be provided wherein the vacuum breaker is positioned in one of the "second passages" and wherein the check valve is positioned in the other of the "second passages." It will further be understood that the use of multiple "second passages" enhances the quantity of fluid (i.e., gas) that can be directed into or out of the rupture line.

It is further contemplated that each of the check valve and the vacuum valve may be threaded into the second passage such that a user can replace the valves with valves of different ratings as desired, without disconnecting the first and second passages from the rupture line and/or the rupture disc.

In operation, line pressure diverter 10 is positioned between rupture line 100 and rupture disc 114, such that first passage 12 is in fluid communication with each. The line pressure diverter may be coupled to the rupture line and the rupture disc by way of clamps or other suitable and commercially acceptable retaining and coupling devices. Once connected the system is ready for use.

In the event that reactor pressure exceeds the pressure rating of the rupture disc, the rupture disc will generally burst placing the reactor in fluid communication with line pressure diverter 10 and rupture line 100. As the fluid will be directed under pressure toward the rupture line header. In turn, as a venturi, a vacuum will be pulled in second passage 14, thereby activating vacuum breaker 16. In turn, air at ambient pressure will be drawn into the second passage through the vacuum breaker. Once the pressure within the rupture line and the rupture line header is substantially equalized, the vacuum breaker will close isolating the second passage from ambient.

In the event that a rupture disc from a different reactor associated with the same rupture line header (i.e., other than reactor 112) bursts and, due to unforeseen circumstances, the pressure in the remaining rupture lines exceeds a predetermined pressure, the line pressure diverter is configured to preclude reverse rupturing of the rupture disc into a reactor. Specifically, inasmuch as the pressure rating of check valve 18 is lower than rupture disc 114, if the pressure within the first and second passage becomes elevated threatening a reverse rupture of a rupture disc into a reactor, the check valve will open and allow the dissipation of the pressure therethrough. Once the pressure falls below a predetermined level, the check valve will again close.

The foregoing description merely explains and illustrates the invention and the invention is not limited thereto except insofar as the appended claims are so limited, as those skilled in the art who have the disclosure before them will be able to make modifications without departing from the scope of the invention.

What is claimed is:

1. A line pressure diverter for placement between a rupture line and a rupture disc associated with a reactor, the line pressure diverter comprising:

a first passage positioned to be in fluid communication with a rupture line at a first end and with a rupture disc at a second end;

at least one second passage positioned to be in fluid communication with the first passage and positioned at an angle relative to the first passage;

a vacuum breaker positioned so as to extend through and into at least one of the at least one second passages; and a check valve positioned to be in fluid communication with at least one of the at least one second passage, the check valve being rated at a rating below that of a rupture disc.

2. The line pressure diverter of claim 1 wherein the first passage comprises a diameter substantially identical to that of a rupture line with which it is associated.

3. The line pressure diverter of claim 1 wherein the angle of the first passage relative to the second passage is substantially approximately between 25° and 75°.

4. The line pressure diverter of claim 3 wherein the angle of the first passage relative to the second passage is substantially approximately 45°.

5. The line pressure diverter of claim 1 further comprising clamps associated with each of the rupture line and the rupture disc, for coupling the line pressure diverter thereto.

6. The line pressure diverter of claim 1, wherein each of the first and second passages comprises pipes of substantially circular cross-section.

7. The line pressure diverter of claim 1 wherein the first passage is of a diameter larger than that of the second passage.

8. The line pressure diverter of claim 1 wherein the first passage is longer than the second passage.

9. The line pressure diverter of claim 1 wherein the first passage and the second passage are positioned relative to each other so as to facilitate a venturi effect.

10. The line pressure diverter of claim 1 wherein the at least one second passage comprises one second passage.

11. A method of diverting flow in a rupture line comprising:

providing a line pressure diverter for placement between a rupture line and a rupture disc associated with a reactor, the line pressure diverter comprising:

a first passage positioned to be in fluid communication with a rupture line at a first end and with a rupture disc at a second end;

at least one second passage positioned to be in fluid communication with the first passage and positioned at an angle relative to the first passage;

a vacuum breaker positioned so as to extend through and into at least one of the at least one second passage; and a check valve positioned to be in fluid communication with at least one of the at least one second passage, the check valve being rated at a rating below that of a rupture disc;

opening the vacuum breaker in the event that the rupture disc associated with the rupture line is triggered, and a vacuum exists in the second passage;

opening the check valve in the event that the pressure in the rupture line approaches the pressure rating of the rupture disc within a predetermined limit; and maintaining either of the vacuum breaker and the check valve until the requisite pressure is present in the second passage.

* * * * *